Dec. 16, 1952     E. T. LUNDEEN     2,621,879
PALLET SUPPORT
Filed May 14, 1948
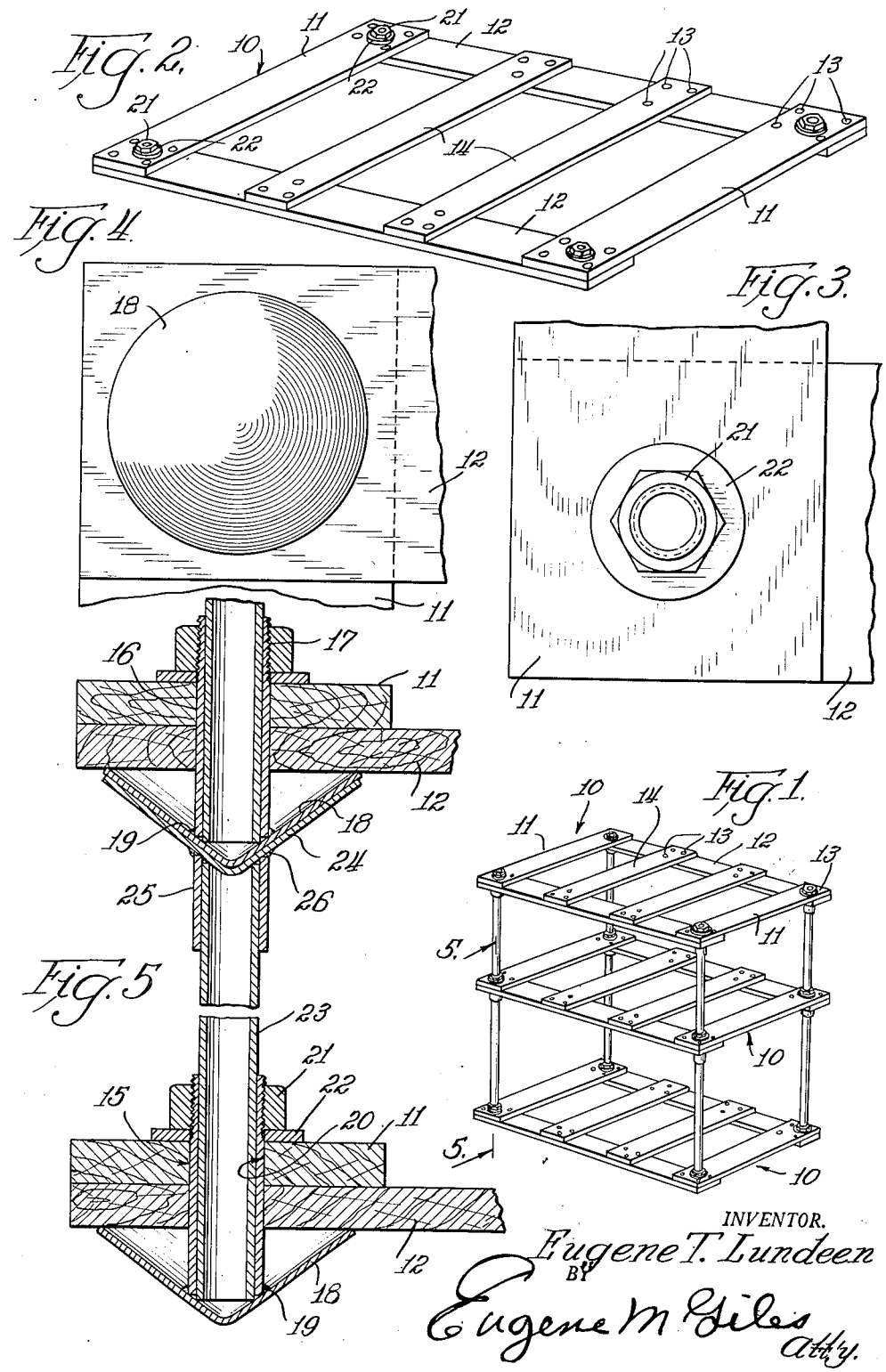
INVENTOR.
Eugene T. Lundeen
BY Eugene M. Giles
Atty.

Patented Dec. 16, 1952

2,621,879

UNITED STATES PATENT OFFICE 2,621,879

PALLET SUPPORT

Eugene T. Lundeen, Chicago, Ill., assignor to The Paltier Corporation, Chicago, Ill., a corporation of Illinois Application May 14, 1948, Serial No. 27,006

6 Claims. (Cl. 248—120)

1

The present invention relates in general to multiple shelf or platform structures which may be quickly assembled and disassembled, finding particular, but by no means exclusive, utility in an arrangement for supporting and stacking a plurality of pallets or platforms such as those used in warehouses, supply depots, and similar places for storage or handling purposes.

Pallet supporting and stacking structures of the character just recited must be adaptable to accommodate a wide variety of articles for storage or handling thereon. It is important that such structures be readily arrangeable in units with different numbers of pallets spaced apart vertically by various distances, all as may be required for the particular storage space and the size of the articles to be stored thereon.

Moreover, as such structures are oftentimes used for transient storage purposes and for different storage from time to time, it is quite important that they be of a quickly disassembled construction and quickly, accurately and securely assembled in any of the diversified forms in which they may be required and without any misplacement of any of the parts which would impair the security of the structure or afford any hazard either to the workmen or the articles stored thereon.

Fork lift trucks are commonly employed for stacking and unstacking such pallets or platforms, usually with the load already in place thereon, and for transporting the loaded pallet from place to place.

Such trucks have a hoist with a flat fork like support which is insertible under the pallet or between top and bottom decks thereof for lifting the same. Consequently, it is desirable that each pallet or platform be constructed to accommodate such fork lifter even when the pallet or platform is resting on the floor. It is also desirable that the superposed pallets or platforms lift directly off the stack without any binding or strain which might disturb the load on the lifted pallet or the security of the structure and contents remaining therebelow. In addition, it is important that the pallets or platforms assume an accurate superposed relation without requiring precise placing thereof on the stack.

One object of the present invention is to provide a load supporting platform structure including a series of pallets stacked in a stable vertical tier and mounted in a manner permitting wide variation in the number of pallets and their vertical spacing, as well as quick assembly and disassembly of such structure.

2

Another object is to provide a load supporting platform structure of the character set forth and which lends itself conveniently to stacking, unstacking, and transport of pallets with utmost speed and safety by the use of a fork lift truck.

A further object is to provide a structure of the foregoing type permitting maximum utilization of floor space when erected and which can be readily disassembled and compactly stored in a minimum amount of space.

Still another object is to provide a pallet supporting and mounting arrangement of exceptional strength and rigidity, being susceptible of economical manufacture from common sizes of structural materials by expedients such as simple stamping cut-off and welding operations.

Other objects and advantages of the invention will become apparent in the light of the following description, taken together with the accompanying drawing, wherein:

Fig. 1 is a perspective view of an illustrative load supporting platform structure embodying my invention, Fig. 2 is a perspective view of one of the pallets or platforms of the structure of Fig. 1, Fig. 3 is an enlarged top view of a corner portion of the pallet or platform of Fig. 2, Fig. 4 is a bottom view of the corner portion shown in Fig. 3, and Fig. 5 is an enlarged vertical sectional view on the line 5—5 of Fig. 1 taken through the corner supports or spacers at a corner of the platform structure.

While the invention is susceptible of various modifications and alternative constructions, an illustrative embodiment has been shown in the drawing and will be described below in considerable detail. It should be understood, however, that there is no intention to limit the invention to the specific form of pallet, platform, or shelf structure disclosed, but on the contrary, the intention is to cover all modifications, alternative constructions, and equivalents falling within the spirit and scope of the invention as expressed in the appended claims.

Referring more specifically to the drawing, it will be perceived that in Figure 1 the invention is shown embodied in an illustrative load supporting platform structure comprising a series of horizontal pallets 10 stacked in a stable vertical tier and maintained in spaced relation by a plurality of detachable upright columns and separable bearing supports. Each such support comprises a pair of separable bearing members having freely nested coacting bearing surfaces lying predominantly outside a plane perpendicular to their associated column or columns. Each of the pallets 10 has a plurality of separable bearing members fixed in downwardly projecting relation therefrom. These members are respectively adapted to nest freely with mating separable bearing members carried by the supporting columns, the latter being those columns extending below the pallet. The bearing members of the bottom pallet, however, simply rest upon the floor. The separable bearing members on each pallet 10 are also attachable respectively to a series of the detachable upright columns extending above the pallet and which, for convenience, might be referred to as the supported columns.

In the present instances, the pallets 10 are all alike and of slatted type, each comprising a pair of end strips 11 and a pair of side strips 12 secured together in rectangular frame form as shown in Fig. 2 by means of nails 13 or any other desired fasteners. A number of cross slats 14 are secured at suitable intervals to the side strips 12 as shown by similar fasteners 13.

Each of the four corners of each pallet 10 is provided with a separable bearing member, indicated as a whole by the reference numeral 15, which cooperates with a spacer or column by which the pallets are supported in superposed spaced apart relation. Each separable bearing member 15 in this case comprises a sleeve 16 externally threaded at one end as at 17 and provided at its other end with a generally convex attachment 18 which happens to be of substantially conical form and is securely attached to the sleeve 16 as for example by welding shown at 19 in Fig. 5. One of these separable bearing members 15 is secured to each corner of each pallet 10 in the same corresponding location through an opening 20, preferably at the center of the overlapping portions of the end and side strips 11 and 12, respectively. Thus when the pallets 10 are in registering superposed relation, the members 15 of the corresponding corners of all the pallets are in exact axial alignment and their apexes are concentric with the axes of their respective columns.

As illustratively shown herein, each separable bearing member 15 is secured in its respective opening 20 by a nut 21 engaged on the threaded portion 17 of the sleeve 16, preferably with a washer 22 interposed between the nut 21 and the corner portion of the shelf 10. Thus the conical head 18 of the sleeve 16 is clamped tightly against the under side of the corner portion of the pallet 10 and the fitting 16 thus serves as a reinforcing which securely holds the overlapped ends of the end and side strips 11 and 12 respectively in firmly joined relation.

Each sleeve 16 serves as a socket for a combined spacer and support column 23 by which the pallets 10 are mounted in superposed spaced apart relation. Each spacer or support column 23 comprises a length of tubing of suitable cross sectional dimension to fit readily but snugly within the sleeve 16 of a separable bearing member 15. Each spacer or support column 23 is provided at its upper end with a separable bearing member 24 presenting a generally concave bearing surface adapted to receive in freely nested relation therein the conical projection 18 of a pallet corner bearing member 15. The bearing member 24 may be substantially conical and attached directly to the upper end of the tubular spacer or support column 23 if desired. In this case, however, the member 24 is secured to a short sleeve 25 as, for example, by welding as shown at 26, so that its conical seat and sleeve assembly is detachable from but concentric with the end of the spacer or support column 23.

In practice the spacers or columns 23 are merely lengths of common sized pipe or tubing and are provided in sets of various lengths for supporting the pallets 10 in whatever selected spaced apart relation may be desired for the user's particular storage purposes. For mounting the pallets 10 one above the other a set of columns 23 of appropriate length is selected and merely inserted in the corner bearing members 15 of one pallet, after which a conical bearing member 24 is slipped onto the upper end of each of these columns 23 and held in position by means of its short sleeve 25, whereupon the next succeeding pallet 10 is mounted in place by merely seating the conical projections 18 of the next succeeding pallet in the respective concave conical bearing members 24 on the columns 23. Additional pallets are applied in like manner and in selected spaced relation by employing columns 23 of suitable selected length.

The separable bearing members 15, 24 are readily applicable to any type of pallet and do not add any material increase in the overall thickness of the pallet which would interfere with compact stacking or storage thereof when not in use, and yet they afford such length of engagement with the columns 23 that the latter are immune to accidental displacement and are maintained securely in an exact upright position which insures accurate superposition and safe support of the pallets superposed thereabove. More over, when the bearing surfaces of the members 15 and 24 are fully nested or engaged, they define a wide area of outboard support for each pallet and about each column 23, at the same time providing lateral stability for the tier in at least two intersecting planes running axially of each column.

The pallets may be of any thickness, composed of a single solid panel or of several similar panels laid one on top of the other and secured together only by the corner fittings, if desired, or they may be of reinforced or double pallet type with reinforcing strips of any depth or thickness suitably arranged thereunder or between the top and bottom decks of the double pallet, and the corner members 15 are readily attachable to any of these types by merely making the tubular portion 16 of the corner member of appropriate length to extend through the corner of the particular pallet.

It is important to note that the pallets are not fastened to the columns or to one another in any manner whatsoever and a multiple pallet structure is assembled merely by setting the parts in their appropriate places.

The column supports 23 may, of course, be easily and quickly placed in their respective corner sockets 16 and the separable bearing members 24 are likewise easily and quickly placed in position on the upper ends of the respective column supports 23.

Thereafter it is merely necessary to set the next succeeding pallet thereon and this is likewise easily and quickly accomplished by reason of the interfitting form of the concave bearing member 24 and the corner heads 18 of the separable bearing members on the pallet. These are self centering, because of their matching conical form, and by reason thereof no special effort or precautions beyond the capacity of a fork lift truck operator are required to locate the pallets accurately in place.

It is only necessary to position the pallet approximately in place over the spacers 23 with the apexes of the pallet cones 18 over any portion of the respective supporting cones 24 and the weight of the pallet itself, when released, will center each pallet 18 in the respective spacer cone 24 and thereby locate the pallet in exact superposed alignment with the pallet or pallets below.

The pallet cones 18 and the conical members 24 are, of course, made of a stock of sufficient strength and rigidity to bear the loads and strains to which they may be subjected and each may, if desired, be made in laminated form of two or more conical members welded or otherwise secured together. Also, while the conical form of the projections 18 and members 24 is preferred, they may be of any other form which will provide a self centering of one within or directly over the other. They may, for example, be of rounded cup shape, or either one may be composed of a plurality of radial arms bent or shaped to fit in a self centering manner within or against the other.

It is important, however, that they be of such slope that they do not bind one within the other, and that they nest together and separate directly and readily without any impairment of the security and stability of the pallet structure therebelow. It is desirable also that they be of sufficiently wide area to afford a relatively large zone of self centering and that they be of such depth that a pallet is supported thereby on a floor at a sufficient elevation to admit the fork of a fork truck thereunder.

The corner posts, while preferably tubular, may be of other form and may be permanently attached to the pallet on which they are mounted, if desired, although the socket type connection shown herein is particularly convenient.

What is claimed is:

1. In a load carrying platform structure having a supporting pallet, the combination comprising a vertical post, a first separable bearing member of substantially conical form, a second separable bearing member also of substantially conical form, said separable bearing members having complementary bearing surfaces, one of said members being attachable to the pallet, the other of said members being attachable to said vertical post, the apexes of said conical bearing surfaces being substantially concentric with the axis of said post and their lateral extremities being substantially outside the transverse dimension of said post thus providing outboard support and lateral stability in said structure.

2. For use in a load supporting platform structure having at least one pallet carried thereby, said pallet having detachable upright columns extending therebelow and similar columns extending thereabove, the combination comprising a first separable bearing member attachable to the pallet in downwardly projecting relation therefrom, said first separable bearing member being attachable to one of said columns extending upward relative to said pallet, a second separable bearing member attachable to another one of said columns extending downward relative to said pallet and alined axially with said one column, said bearing members having freely nested coacting bearing surfaces lying predominantly outside a plane perpendicular to said alined columns and terminating in lateral extremities of substantially greater dimension than the transverse dimension of said one column, said bearing surfaces being complementary and constructed and arranged to provide lateral stability in at least two intersecting planes running axially of said alined columns.

3. For use with a load supporting platform structure freely detachable from a plurality of supporting columns extending therebelow and from a plurality of supported columns extending thereabove, a separable bearing support comprising, in combination, a generally convex member attachable to the platform structure in downwardly projecting relation therefrom, means on said generally convex member for receiving one of said supported columns, a generally concave member attachable to one of said supporting columns alined with said one supported column, both of said members having substantially complementary bearing surfaces freely nestable with each other and terminating in lateral extremities of substantially greater dimension than the transverse dimension of said alined columns, said bearing surfaces being substantially concentric with the axis of said alined supported and supporting columns and disposed to provide lateral stability in at least two intersecting planes running axially of said alined columns.

4. In a load supporting platform structure, the combination comprising a supporting pallet with a plurality of upright openings threthrough, a pair of axially alined vertical posts disposed in alinement with each said opening, one said post being mounted in the upright opening and extending above said pallet, the other said post being disposed in supporting relation below said pallet, a first separable bearing member of substantially convex form, a second separable bearing member of substantially concave form, said separable bearing members being interposed between the adjacent ends of said vertical posts and having complementary bearing surfaces each defining an apex, one of said members being attached to said pallet, the other of said members being attached to said other vertical post, the apexes of said bearing surfaces being substantially concentric with the common axis of said vertical posts and their lateral extremities being well outside the dimension of said posts providing outboard support over an annular area of relatively large dimension.

5. In a load supporting platform structure having at least one pallet connected to detachable upright supporting posts extending downward and upward relative to the pallet, a separable bearing support comprising, in combination, a first separable bearing member attachable to the pallet, a socket fitting fixed to said first separable bearing member for receiving one of said upright posts extending upward relative to the pallet, a second separable bearing member attachable to another of said posts below and axially alined with said one post, a socket fitting fixed to said second separable bearing member for receiving said other post, said bearing members having freely nested coacting bearing surfaces lying outside a plane perpendicular to said alined posts and terminating in lateral extremities of substantially greater dimension than the transverse dimension of said posts, one of said bearing surfaces having a point of tangency with said perpendicular plane, said bearing surfaces being complementary and constructed and arranged to provide lateral stability in at least two intersecting planes running axially of said alined posts.

6. In a load supporting platform freely detachable from a plurality of supporting columns, a plurality of separable bearing supports each comprising, in combination, a generally convex member, a generally concave member, one of said members being attachable to the platform, a socket fixed to said one member for receiving one of said columns extending upward through the platform, the other of said members being attachable to another one of said supporting columns, both of said members having substantially complementary bearing surfaces lying outside a plane perpendicular to said columns but the bearing surface of said convex member being tangent to said perpendicular plane, said bearing surfaces terminating in lateral extremities of substantially greater dimension than the transverse dimension of said one supporting column, said bearing surfaces also being substantially concentric with the axis of said one column.

EUGENE T. LUNDEEN.

REFERENCES CITED

The following references are of record in the file of this patent:

UNITED STATES PATENTS

| Number | Name | Date |
| --- | --- | --- |
| 904,758 | Cropp | Nov. 24, 1907 |
| 1,490,665 | Gifford | Apr. 15, 1924 |
| 1,789,126 | Aldeen | Jan. 13, 1931 |
| 1,940,242 | Burgess | Dec. 19, 1933 |